J. R. MITCHELL.
FRICTION DRAFT RIGGING.
APPLICATION FILED APR. 3, 1919.
1,355,995.
Patented Oct. 19, 1920.
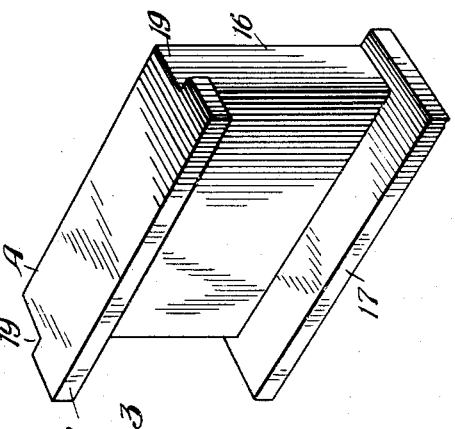
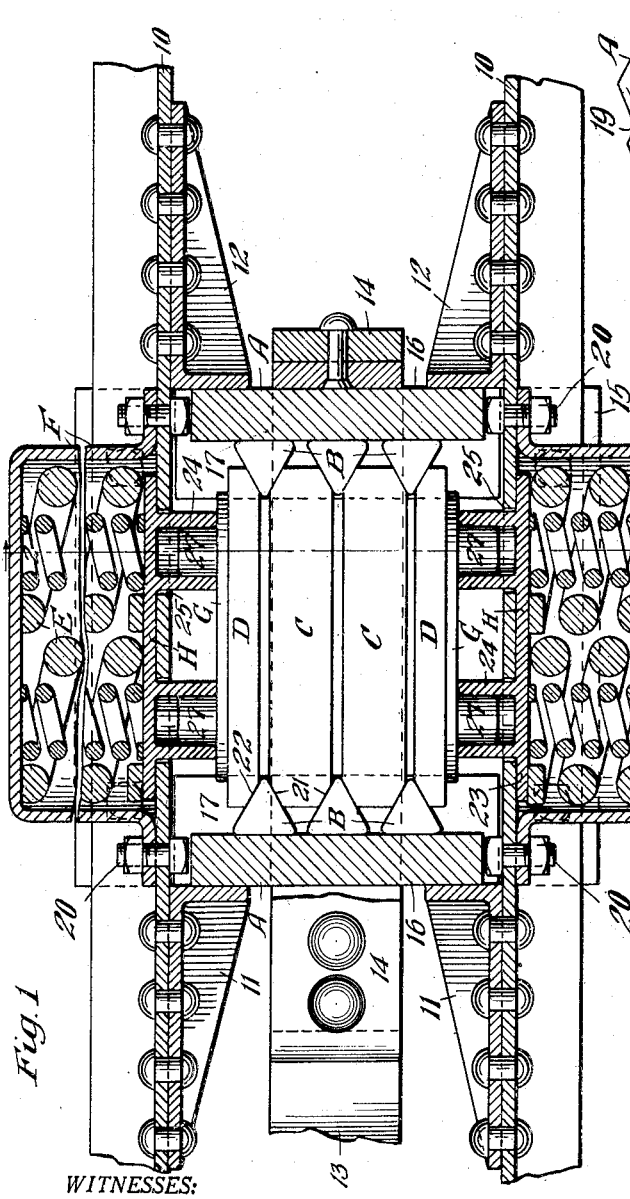
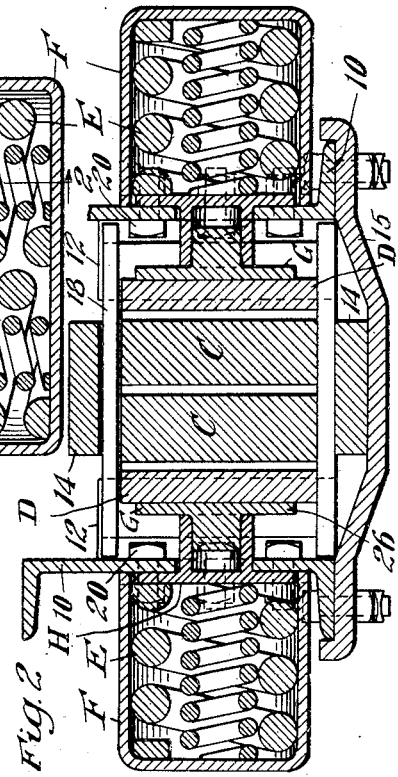
WITNESSES:
Wm. Geiger
INVENTOR.
John R. Mitchell
BY George I. Haight
his ATTORNEY

UNITED STATES PATENT OFFICE.

JOHN R. MITCHELL, OF EVANSTON, ILLINOIS, ASSIGNOR TO WILLIAM H. MINER, OF CHAZY, NEW YORK.

FRICTION DRAFT-RIGGING.

1,355,995.　　　　Specification of Letters Patent.　　Patented Oct. 19, 1920.

Application filed April 3, 1919. Serial No. 287,230.

*To all whom it may concern:*

Be it known that I, JOHN R. MITCHELL, a citizen of the United States, residing at Evanston, in the county of Cook and State of Illinois, have invented a certain new and useful Improvement in Friction Draft-Riggings, of which the following is a full, clear, concise, and exact description, reference being had to the accompanying drawings, forming a part of this specification.

This invention relates to improvements in friction draft riggings.

The object of this invention is to provide a friction draft rigging for railway cars having high capacity and adapted to be placed within a relatively short spacing between the sills, the friction parts being such that the same may be manufactured at comparatively small expense as castings.

In the drawing forming a part of this specification, Figure 1 is a horizontal, sectional view of a portion of a railway draft rigging showing my improvements in connection therewith, all of the parts being in normal or full release position. Parts are broken away in the upper portion of the figure in order to better accommodate the figure on the sheet. Fig. 2 is a vertical, transverse, sectional view taken substantially on the line 2—2 of Fig. 1 and Fig. 3 is a detail perspective of one of the followers employed with my improvements.

In said drawing, 10—10 denote channel-shaped center or draft sills, to the inner faces of which are secured front and rear stop lugs 11 and 12, the same being of any desired or well-known form. As shown in the drawing, the space between the stop lugs 11 and 12 is comparatively short, the spacing being such as would be encountered —for instance, in ore cars, where the usual spacing for friction gears is impossible. The drawbar is indicated at 13 and the same is operatively associated with the shock absorbing mechanism proper by any suitable means, such as the yoke 14. The parts are supported between the sills as by a detachable saddle plate 15.

The improved shock absorbing mechanism proper, as shown comprises front and rear followers A—A, front and rear sets of friction wedges B—B, intermediate friction shoes C—C, side friction shoes D—D, laterally arranged springs E—E, spring caps or housings F—F and pressure transmitting elements on each side of the friction shoes, indicated at G and H.

Each of the followers A is in the form shown most clearly in Fig. 3 and comprises a main or follower portion proper 16, lower horizontal flange 17 and upper horizontal flange 18. The upper flange 18 is notched at the inner corners, as indicated at 19, so as to permit a removal of the followers while the bolts 20—20 are in place. As will be understood, the flanges 17 and 18 form supporting and guiding means for the friction wedges B—B and the ends of the friction shoes C and D.

Each of the friction wedges B is substantially of equilateral triangular shape in cross section as shown in Fig. 1, and there are preferably three of said wedges at each end of the mechanism. The friction shoes C are preferably two in number and each of the same is provided, at each end thereof, with opposed wedge faces, as indicated at 21—21, to coöperate with the corresponding faces of the wedges B—B. The outer or lateral friction elements D—D are provided, at their ends, with single wedge faces, as indicated at 22—22, to coöperate with the outer faces of the outermost friction wedges B—B. The ends of the friction elements C and D extend between the flanges 17 and 18 of the followers, and, of course, are thus supported.

On each side of the center sills are disposed the springs E—E, the latter being preferably arranged in pairs. The springs are confined within the cup-shaped caps or casings F, which are secured to the outer faces of the draft sills as by the bolts 20. It will be noticed that the springs E are restrained against movement lengthwise of the sills and are adapted to be compressed in a direction transverse to the sills.

To effect the compression of the springs E when the friction elements are actuated, duplicate sets of the pressure transmitting members G and H are employed. Each member H comprises a flat or plate portion 23 sufficient in area to form a follower for the inner ends of the pair of adjacent springs E. Each plate H is furthermore provided with a pair of hollow, inwardly-extending bosses or sleeves 24, which are extended through corresponding slots 25 provided in the center sills. Each member G comprises a main plate section 26 that bears against the outer flat face of the adjacent friction shoe D, as shown in Fig. 2. Each plate G is furthermore provided, on its outer side, with a pair of laterally extended lugs 27, telescoped within the annular sleeves 24 of the member H. The openings 25 in the draft sills correspond substantially in size to the size of the sleeves 24, so that the latter, and, consequently, both members G and H, are prevented from longitudinal movement and are restricted to lateral movement or movement in a direction at right angles to the center line of draft.

In operation, upon inward movement of the draw-bar and front follower A, it is evident that the front set of friction wedges B—B will be forced rearwardly, thus spreading the friction shoes C and D, the latter also, of course, moving bodily rearwardly and co-acting with the rear set of friction wedges B. As the friction shoes move rearwardly, and particularly the outer or lateral shoes D—D, the shoes D slide with respect to the members G, but, at the same time, force the members G outwardly so as to effect compression of the springs E. The action under draft will be understood from the preceding description of the action under buff.

With the arrangement shown and described, it is evident that all the friction elements may be manufactured, as white iron castings, at comparatively small expense. A large frictional wearing-away is developed not only between the wedges B and shoes C and D, but also between the shoes D and the members G. Furthermore, by employing the plunger arrangement shown for transmitting the pressure to the springs, I avoid unduly cutting away the draft sills, such as has heretofore been customary in certain types of friction gears where the springs outside of the sills have been permitted longitudinal body movement.

I claim:

1. In a friction draft rigging, the combination with draft sills, stop-acting means, and end followers, of a plurality of friction members interposed between said followers and including side elements having both lateral and longitudinal movement, springs on the outer sides of the sills compressible laterally and restrained against movement lengthwise of the sills, and means for transferring the lateral movement of said side elements to said springs for compressing the latter upon actuation of the rigging, said means being also restrained against movement longitudinally of the sills.

2. In a friction draft rigging, the combination with draft sills, stop-acting means, and end followers, of a plurality of friction members interposed between said followers and including side elements having both lateral and longitudinal movement, springs on the outer sides of the sills compressible laterally and restrained against movement lengthwise of the sills, and means for transferring the lateral movement of said side elements to said springs for compressing the latter upon actuation of the rigging, said means including plates having lugs extended through slots in the sills, said plates being also restrained against movement lengthwise of the sills.

3. In a friction draft rigging, the combination with draft sills, stop-acting means, and end followers, of a plurality of friction members interposed between said followers and including elements movable laterally and longitudinally, springs on the outer sides of said sills, spring casings also secured to the outer sides of said sills and in which said springs are confined and restricted against longitudinal movement, means for transferring movement of said lateral friction elements to said springs to compress the latter in a direction transversely to the sills, said means including plates on the inner sides of the sills having inner longitudinally extending friction faces arranged to coöperate with said elements whereby friction is generated between said plates and elements upon actuation of the mechanism.

4. In a friction draft rigging, the combination with draft sills, stop-acting means, and end followers, of a plurality of friction members interposed between said followers and including side elements having both lateral and longitudinal movement, springs on the outer sides of the sills, compressible laterally and restrained against movement lengthwise of the sills, and means for transferring the lateral movement of said side elements to said springs for compressing the latter upon actuation of the rigging, said means including a set of members on each side of the draft rigging, each set including a plate on the outer side of the draft sill and a plate on the inner side of the draft sill, each set having lugs extending through slots in the sills.

5. In a friction draft rigging the combination with draft sills, stop-acting means, and end followers, of a plurality of friction wedges on the inner face of each follower, a plurality of longitudinally extending friction shoes between the friction wedges, said friction shoes including two side elements adapted for both longitudinal and lateral movement, a plate on the outer face of each of said side elements and adapted for relative longitudinal movement with respect thereto, a plate on the outer side of each sill, pressure transmitting means between the plates, springs on the outer sides of said outer plates, and means for holding said springs against movement lengthwise of the sills.

6. In a railway draft rigging, the combination with draft sills, stop-acting means, and front and rear end followers; of end wedges disposed on the inner sides of said followers; of longitudinally extending friction elements extending between and cooperating with said end wedges and adapted for combined longitudinal and lateral movement, the outer ones of said friction elements having longitudinally extending outer friction surfaces; friction members held against longitudinal movement and having inner longitudinally extending friction surfaces coöperating with said outer friction surfaces of the friction elements, said friction members being movable transversely of the line of relative movement of the end wedges; and spring means for yieldingly resisting said transverse movement of said friction members whereby, upon actuation of the draft rigging, all sets of coöperating friction surfaces are actuated simultaneously upon either buff or draft.

In witness that I claim the foregoing I have hereunto subscribed my name this 18th day of March, 1919.

JOHN R. MITCHELL.